United States Patent
White et al.

(10) Patent No.: US 8,146,119 B2
(45) Date of Patent: Mar. 27, 2012

(54) APPARATUS AND METHOD FOR MANAGING MEDIA CONTENT

(75) Inventors: Scott White, Austin, TX (US); Gerard Edwards, Lansing, NY (US); Loraine Sanchez, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 547 days.

(21) Appl. No.: 11/855,654

(22) Filed: Sep. 14, 2007

(65) Prior Publication Data
US 2009/0077610 A1 Mar. 19, 2009

(51) Int. Cl.
G06F 3/00 (2006.01)
G06F 13/00 (2006.01)
H04N 5/445 (2011.01)

(52) U.S. Cl. ............... 725/44; 725/37; 725/38; 725/51; 725/54

(58) Field of Classification Search .................. 725/58
See application file for complete search history.

(56) References Cited

U.S. PATENT DOCUMENTS

| | | | |
|---|---|---|---|
| 2002/0124256 A1* | 9/2002 | Suzuka | 725/55 |
| 2004/0098754 A1* | 5/2004 | Vella et al. | 725/135 |
| 2004/0181815 A1* | 9/2004 | Hull et al. | 725/134 |
| 2004/0260786 A1* | 12/2004 | Barile | 709/217 |
| 2005/0240494 A1 | 10/2005 | Cue | |
| 2005/0251565 A1 | 11/2005 | Weel | |
| 2005/0289634 A1* | 12/2005 | Yoda et al. | 725/134 |
| 2006/0143236 A1* | 6/2006 | Wu | 707/104.1 |
| 2006/0280437 A1 | 12/2006 | Logan | |
| 2007/0192798 A1* | 8/2007 | Morgan | 725/51 |
| 2007/0220552 A1* | 9/2007 | Juster et al. | 725/46 |
| 2008/0005770 A1* | 1/2008 | Acharya et al. | 725/101 |
| 2008/0066112 A1* | 3/2008 | Bailey et al. | 725/58 |
| 2008/0086747 A1* | 4/2008 | Rasanen et al. | 725/46 |
| 2008/0163318 A1* | 7/2008 | Chen et al. | 725/109 |

* cited by examiner

Primary Examiner — Justin Shepard
(74) Attorney, Agent, or Firm — Guntin Meles & Gust, PLC; Pablo Meles

(57) ABSTRACT

A system that incorporates teachings of the present disclosure may include, for example, a set top box having a controller to generate a playlist that identifies multimedia content and to provide access to the playlist in response to a request for access, where the request for access is transmitted over the Internet, and where the multimedia content is stored remotely from the set top box. Other embodiments are disclosed.

22 Claims, 5 Drawing Sheets

US 8,146,119 B2

APPARATUS AND METHOD FOR MANAGING MEDIA CONTENT

FIELD OF THE DISCLOSURE

The present disclosure relates generally to communication services and more specifically to an apparatus and method for managing media content.

BACKGROUND

Set top boxes (STBs) can provide presentation of media programming and content. There is often a desire to share with others this content. However, STBs are limited by hardware constraints or other system capabilities. Sharing potentially large media files between STBs, such as over asymmetrical DSL, is an inefficient process limited in part by the serving STB's upstream bandwidth.

DETAILED DESCRIPTION

In one embodiment of the present disclosure, a computer-readable storage medium can have computer instructions for monitoring for a request for access to a playlist stored on an original set top box where the request for access is from a requesting set top box where the original and requesting set top boxes are of a group of set top boxes that are in communication with each other over the Internet and where the playlist is generated by the original set top box and identifies multimedia content stored remotely, determining permission for the access to the playlist, and providing the requesting set top box with the access to the playlist when the permission for the access is granted.

In one embodiment of the present disclosure, a server can have a controller to monitor a group of set top boxes for a request for access to a playlist stored on an original set top box of the group of set top boxes where the request for access is from a requesting set top box of the group of set top boxes and where the playlist is generated by the original set top box and identifies multimedia content stored remotely from the original set top box, and provide the requesting set top box with the access to the playlist.

In one embodiment of the present disclosure, a set top box can have a controller to generate a playlist that identifies multimedia content, and to provide access to the playlist in response to a request for access, where the request for access is transmitted over the Internet, and where the multimedia content is stored remotely from the set top box.

In one embodiment of the present disclosure, a set top box can have a controller to transmit a request for access to a playlist of another set top box, and to present the playlist to a user when permission for access is granted, where the playlist identifies multimedia content and is generated by the another set top box, where the request for access is transmitted over the Internet, and where the multimedia content is stored remotely from the set top box and the another set top box.

In one embodiment of the present disclosure, a method can involve generating and storing a playlist on an original set top box that identifies multimedia content stored remotely from the original set top box, monitoring a group of set top boxes for a request for access to the playlist where the request for access is from a requesting set top box of the group of set top boxes and where the group of set top boxes are in communication with each other over the Internet, determining permission for the access to the playlist, and providing the requesting set top box with the access to the playlist when the permission for the access is granted.

Figure 1:
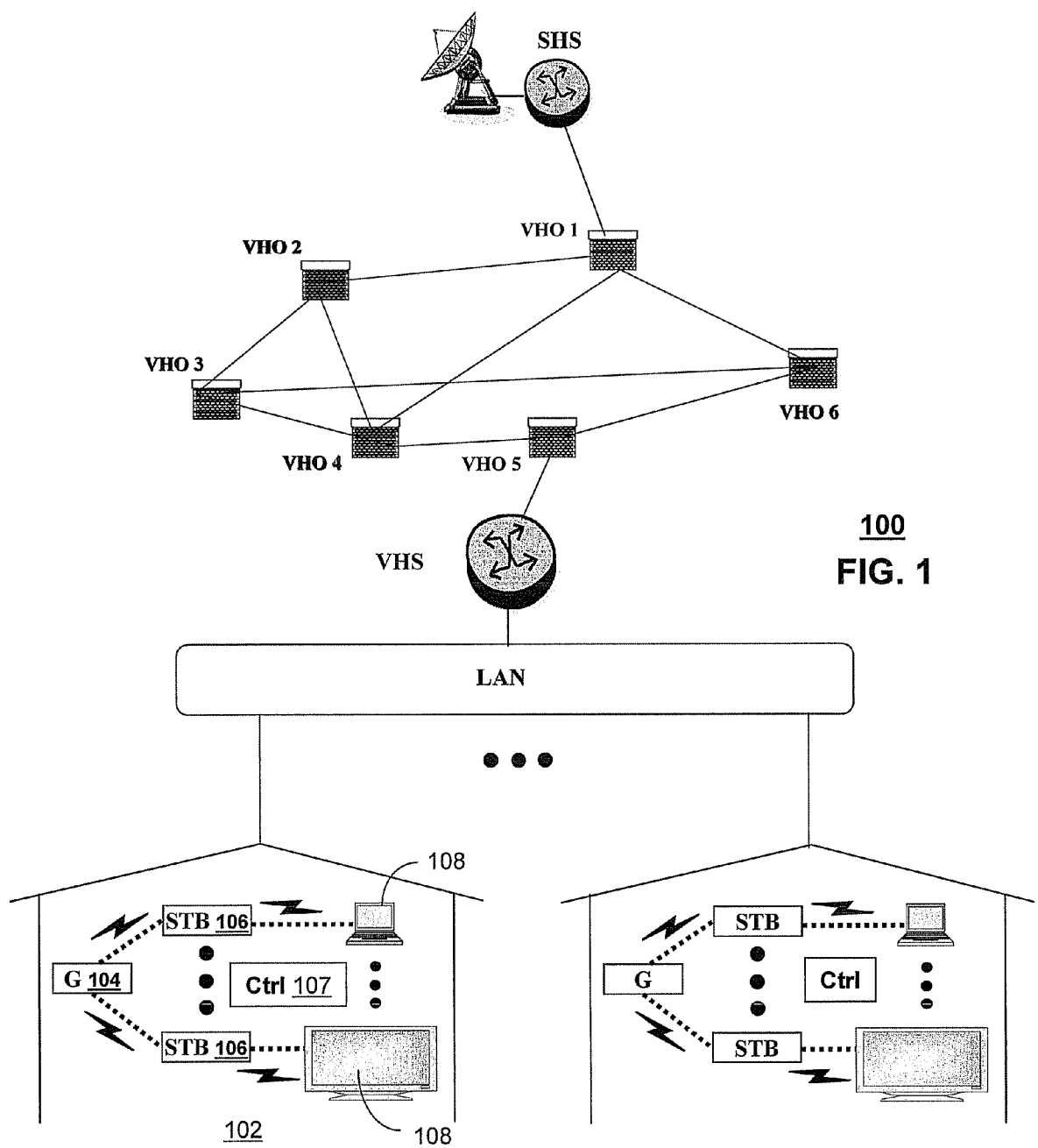
FIGS. 1-3 depict exemplary embodiments of communication systems.

FIG. 1 depicts an exemplary embodiment of a communication system 100 employing an IPTV broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Figure 2:
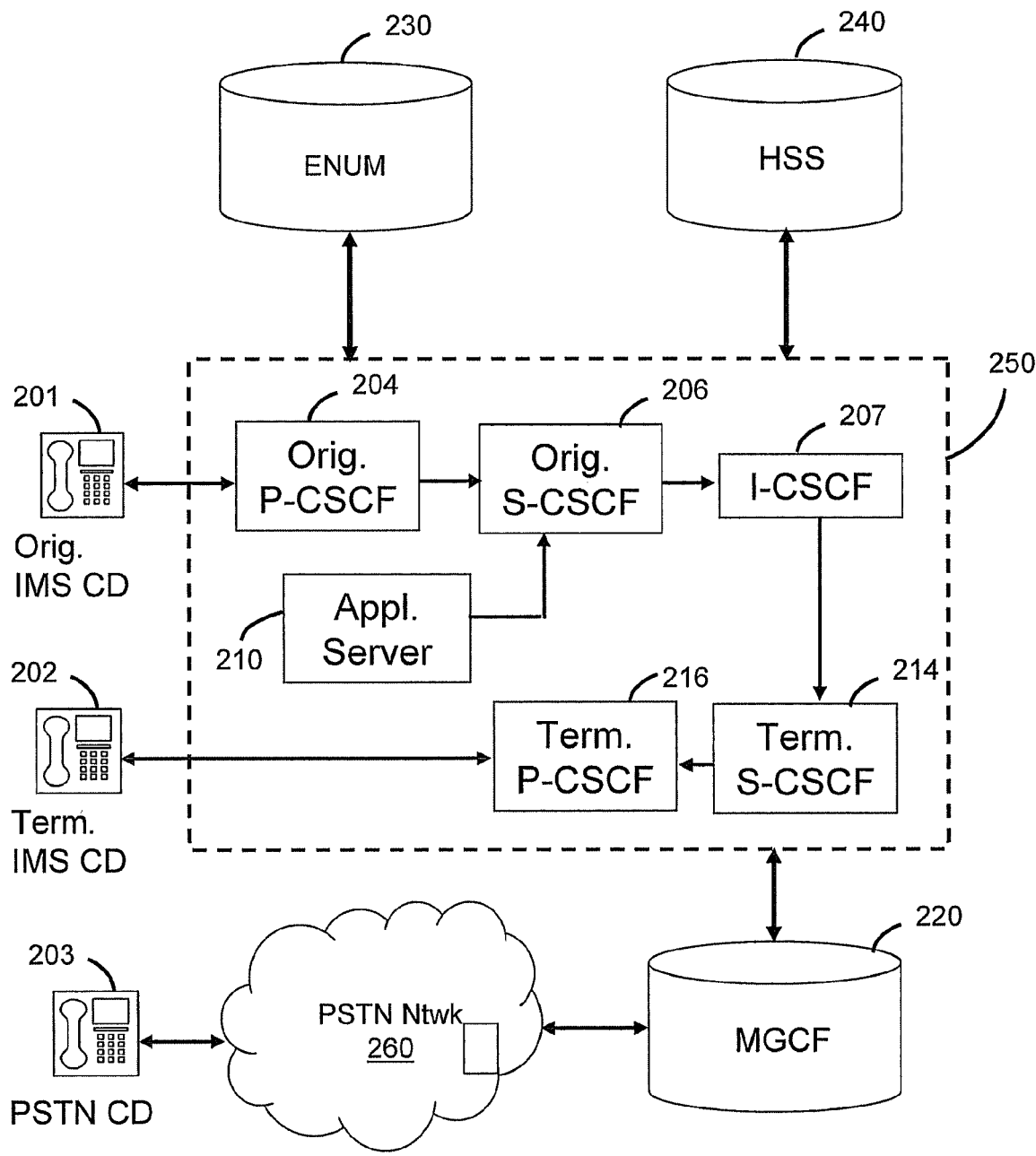

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 (e.g., set top boxes) or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 can register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
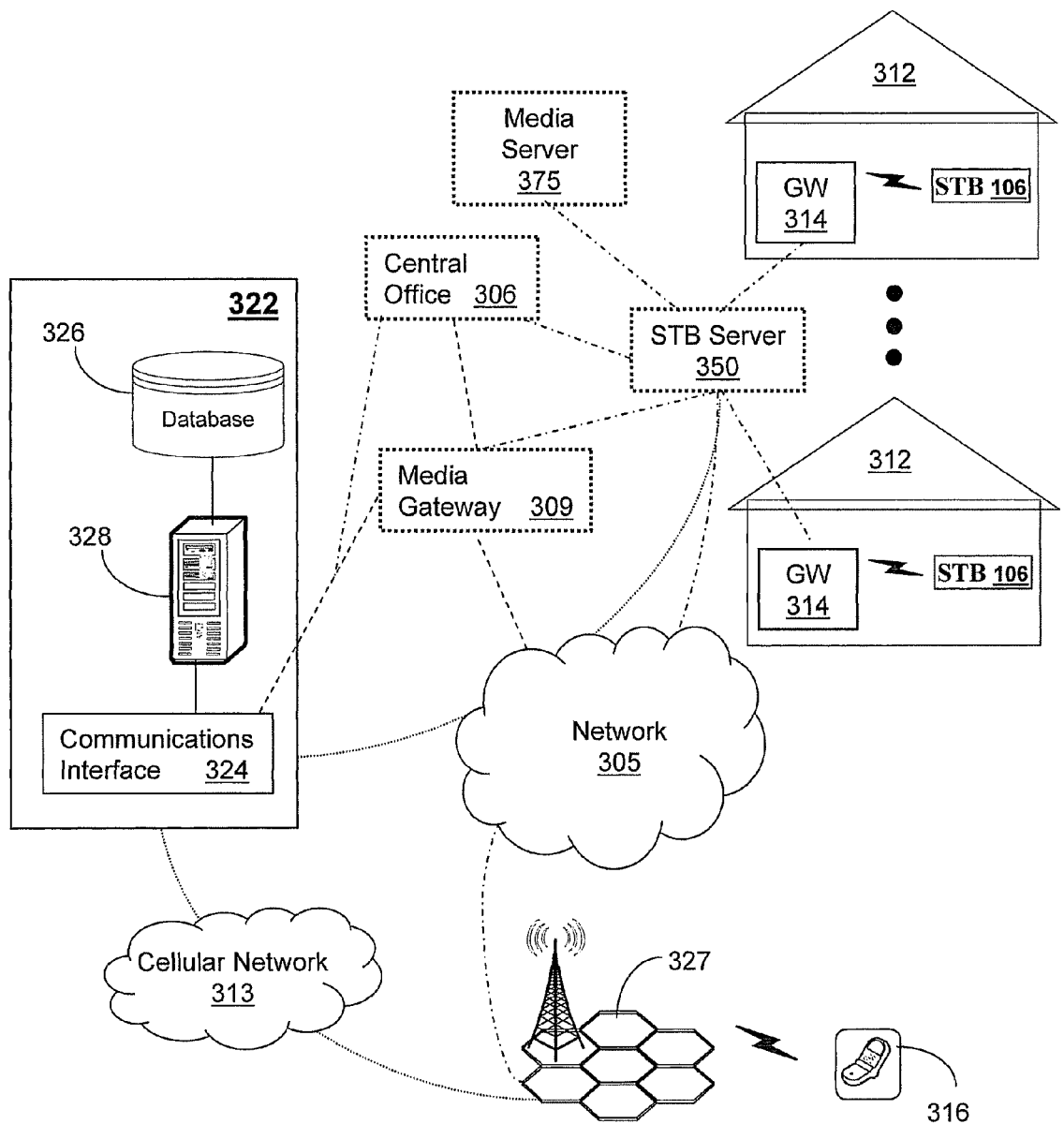

FIG. 3 depicts an exemplary embodiment of a communication system 300 employing set top box 106 communicating by way of wireless access points (WAPs) and/or wired infrastructure with other set top boxes and/or other communication devices and/or a network proxy or web server 322, which collectively operate in the communication system 300. Communication system 300 can be overlaid or operably coupled with communication systems 100 and/or 200 as another representative embodiment of the communication system.

The set top boxes 106 can be multimedia devices for communicating video, voice and/or data, as well as receiving multimedia programming. The set top boxes 106 can include a tuner for receipt of the media programming, and a digital video recorder (DVR) or personal video recorder (PVR) for recording multimedia content. The set top box 106 can have a processor, memory and other components that allow for generating and storing playlists associated with various multimedia content. The playlists can include data associated with the location of the particular multimedia content identified therein, and can include other information, such as multimedia properties, descriptions, and so forth. The playlists can be of various formats, including combinations of formats, such as M3U, PLS, ASX, SMIL, KPL, XSPF, and/or WPL.

The set top boxes 106 can be multimode communication devices that can communicate via a number of modes of communication, including wired and/or wireless communication. The communication system 300 can comprise a packet-switched network 305. The packet-switched network can be an Internet Service Provider (ISP) network 305. The network 305 can be coupled to the network proxy 322, the cellular network 313 and network elements located in one or more of the buildings 312 representing an enterprise or residence. The ISP network 305 utilizes technology for transporting Internet traffic.

In an enterprise setting, the building 312 can include a gateway 314 that provides voice and/or video connectivity services between the set top boxes 106. In a residential setting, the building 312 can include a gateway 314 represented by, for example, a residential gateway coupled to central office 306 utilizing conventional telephonic switching for processing calls with third parties.

The network proxy 322 can be used to control operations of a media gateway 309, the central office 306 and the gateway 314. Communications between the network proxy 322, the set top boxes 106 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the media gateway 309, the cellular network 313, and/or the gateway 314. By way of the communications interface 324, the network proxy 322 can direct by common means any of the foregoing network elements to establish packet switched data, voice, and/or video connections between set top boxes 106 distributed throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for the set top boxes 106, including VoIP terminals.

The central office 306 can house common network switching equipment for distributing local and long-distance telecommunication services supplied by network 305 to buildings 312 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications.

The cellular network 313 can support voice and data services over a number of access technologies such as GSM-GPRS, EDGE, CDMA-1X, UMTS, WiMAX, software defined radio (SDR), and other known and future technologies. The cellular network 313 can be coupled to base stations 327 under a frequency-reuse plan for communicating over-the-air with other communication devices of the communication system, including set top boxes 106.

The communication system 300 can include an STB server 350 that is in communication with one or more of the STBs 106 in the system. The STB server 350 can include various components, such as a controller, communications interface and memory, and can utilize various protocols for communication with the STBs 106, as well as with other communication or network devices of the communication system 300. The STB server 350 can be a separate device or sub-system of the communication system 300, or can be incorporated with other components of the communication system, such as being incorporated into the network proxy 322, including sharing one or more components with the network proxy. In one embodiment, the STB server 350 can communicate with one or more of the STBs 106 over the Internet.

The communication system 300 can include a media server 375 that is in communication with the STB server 350 and/or one or more of the STBs 106 in the system. In one embodiment, the media server 375 can store multimedia content that can be accessed (e.g., streaming) by the STBs 106 through use of the playlists. In another embodiment, the media server 375 can search for, and provide access to, multimedia content identified in a playlist of the STB 106, such as by querying media databases over the Internet. The media server 375 can include various components, such as a controller, communications interface and memory, and can utilize various protocols for communication with the STB server 350 and/or the STBs 106, as well as with other communication or network devices of the communication system 300. The STB server 350 can be a separate device or sub-system of the communication system 300, or can be incorporated with other components of the communication system, such as being incorporated into the STB server 350 and/or the network proxy 322, including sharing one or more components with the network proxy.

Figure 4:
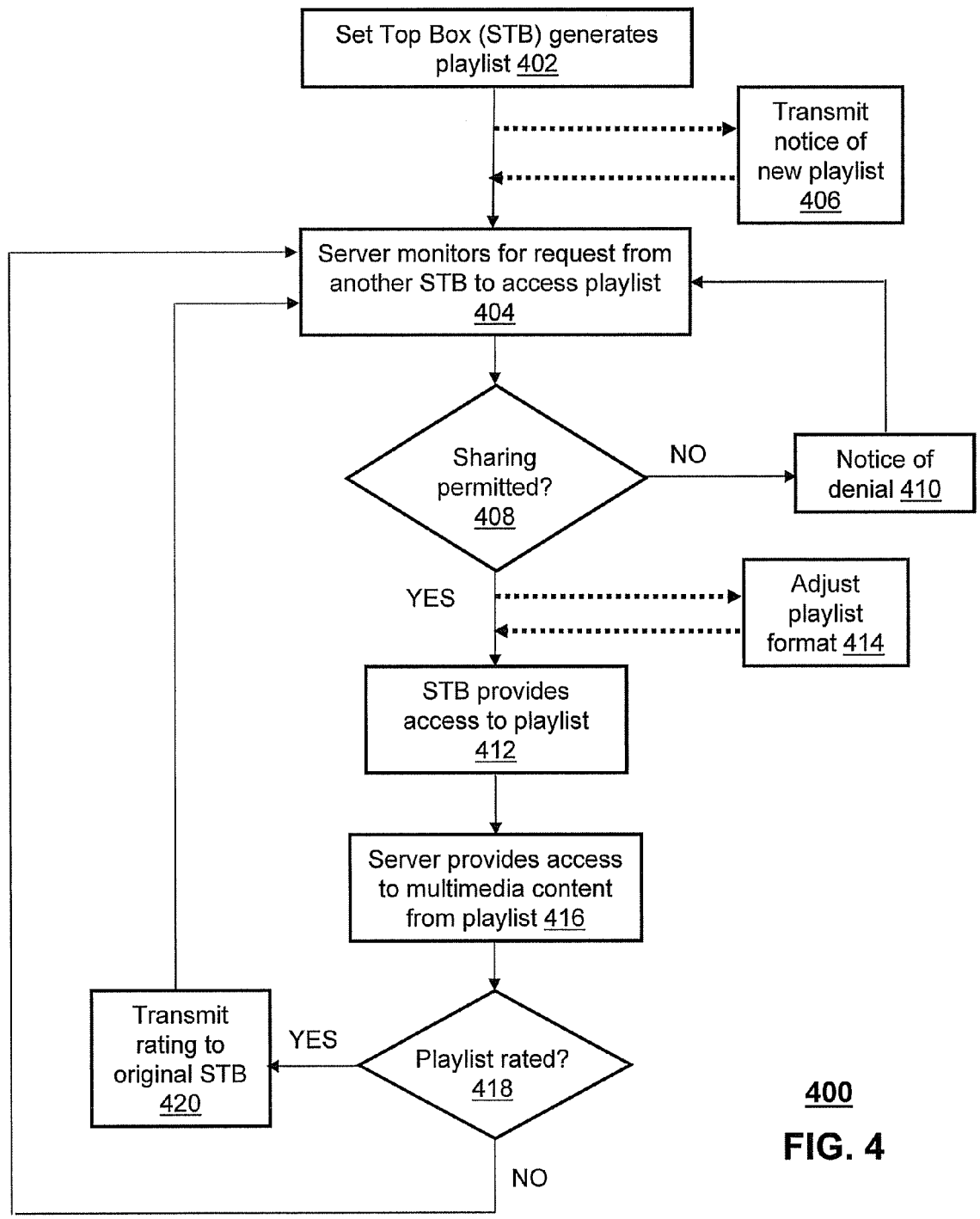
FIG. 4 depicts an exemplary method operating in portions of the communication systems.

FIG. 4 depicts an exemplary method 400 operating in portions of the communication systems 100-300. Method 400 has variants as depicted by the dashed lines. It would be apparent to an artisan with ordinary skill in the art that other embodiments not depicted in FIG. 4 are possible without departing from the scope of the claims described below. For convenience, reference to one or more features of communication system 300 as used in the following paragraphs can mean one or more features of the communication systems 100, 200, and 300 singly or in combination, including servers 322, 350 and 375.

Method 400 begins with step 402 in which an STB 106 ("original STB") can generate and store a playlist of multimedia content. The particular multimedia content can vary and can include video, audio and a combination of the two, such as a playlist of movies and songs. In step 404, the STB server 350 can monitor for a request from another STB 106 ("requesting STB") to access or share the playlist of the original STB. In one embodiment, the generation of a new playlist can cause a notification message to be sent out to various STBs 106 in a community or group of STBs, as in step 406. The one or more recipients of the notification message can be selected by the original STB 106, such as at the time of generating the playlist, or according to a pre-selection made by the user of the original STB (e.g., a pre-selection in a user profile).

The original and requesting STBs 106 can be part of the group of STBs, where the particular size and configuration of the group of STBs can vary, and can be based upon a number of criteria, including geographic location and relationship between the subscribers. In one embodiment, the group of STBs 106 can communicate with each other over the Internet. In another embodiment, the group of STBs 106 can be a virtual private or STB network. For example, the virtual STB network can be formed and can function using tunneling protocol through an existing network. The interconnected nodes associated with the group of STBs 106 can be maintained under a single administrative control or under multiple administrative authorities, such as being hidden from the public Internet.

In step 408, the STB server 350 can determine if sharing of the playlist is permitted or is otherwise authorized by the original STB 106. For example, at the time of generating the playlist, the original STB 106 can designate one or more other STBs that are permitted access to the playlist. The present disclosure also contemplates the designation being included in a user profile associated with the original STB 106. In another example, the original STB 106 can grant permission to share the playlist at the time of the request being made by the requesting STB, such as in response to a requesting message being forwarded from the STB server 350 to the original STB.

If the STB server 350 determines that sharing is not permitted then in step 410 a notice of denial of the sharing request can be transmitted to the requesting STB 106. If on the other hand sharing is permitted then in step 412 the STB server 350 can provide the requesting STB 106 with access to the playlist of the original STB. For example, a playlist of various formats can be transmitted from the original STB 106 to the requesting STB. In one embodiment, the particular format of the playlist can be adjusted according to a preference of the requesting STB 106, such as reformatting by the STB server 350 prior to transmitting to the requesting STB as in step 414.

In step 416, the STB server 350 can provide the requesting STB 106 with access to a selection of the multimedia content from the playlist, such as streaming, progressive download, and/or full download of the multimedia content from the media server 375. In step 418, the STB server 350 can determine if the playlist has been rated by the requesting STB 106. The rating can take many forms, including comments, and can be of the entire playlist or selections from the playlist. If the playlist has not been rated then the STB server 350 can continue to monitor for a request from another STB 106 to share or otherwise access the playlist as recited back in step 404. If on the other hand, the playlist has been rated then in step 420 the rating can be transmitted to the original STB 106 and the STB server 350 can continue to monitor for a request from another STB to share or otherwise access the playlist as recited back in step 404.

Upon reviewing the aforementioned embodiments, it would be evident to an artisan with ordinary skill in the art that said embodiments can be modified, reduced, or enhanced without departing from the scope and spirit of the claims described below. In one embodiment, the group of STBs 106 can share playlists through use of a de-centralized system. For example, the STBs 106 can contact each other directly to provide access to a playlist stored on one of the STBs within the group. In another embodiment, the sharing of the playlists can be based at least in part on user profiles. For example, an original user can share his or her generated playlist with a requesting user based upon the user profiles associated with the original and requesting user.

The type of access provided to the requesting STBs can be varied. For example, an original STB 106 can provide requesting STBs with temporary access to the playlist, such as providing a time limit for the access and denying the ability to copy the playlist into the memory of a requesting STB. As another example, the original STB 106 can provide the requesting STBs with unlimited access to the playlist, such as the ability to copy the entire playlist or a portion thereof into the memory of a requesting STB. As yet another example, the original STB 106 can prevent a requesting STB from forwarding the playlist to other STBs.

Other information associated with the playlist and multimedia content identified therein can be shared amongst the group of STBs. For example, the original STB 106 can provide a requesting STB with access to ratings provided by other requesting STBs. The preservation of playlists can be maintained as STBs 106 are entering the group or leaving the group. For example, as an STB 106 is to be de-activated, such as a subscriber switching service providers, the playlist can be transferred to another STB in the group for storage.

These are but a few examples of modifications that can be applied to the present disclosure without departing from the scope of the claims. Accordingly, the reader is directed to the claims section for a fuller understanding of the breadth and scope of the present disclosure.

Figure 5:
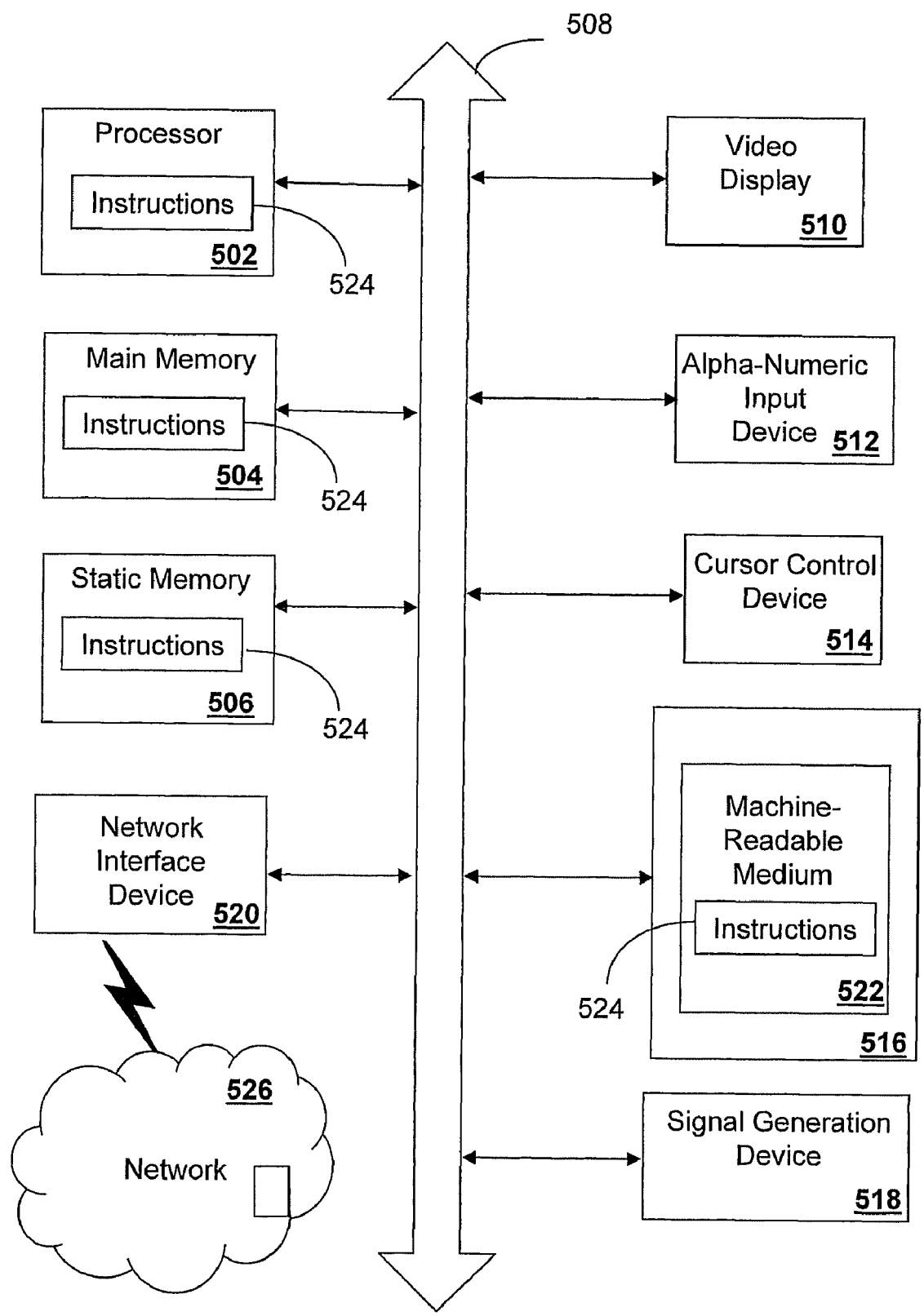
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there-from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium, comprising computer instructions for:
    transmitting a notice to a group of set top boxes that are in communication with each other that a playlist has been generated by an original set top box;
    receiving a request for access to the playlist stored on the original set top box of a first subscriber, the request for access being from a requesting set top box of a second subscriber, the original and requesting set top boxes being of the group of set top boxes that are in communication with each other, the playlist being generated by the original set top box and identifying multimedia content stored remotely from the original set top box;
    determining from a user profile of the first subscriber whether the second subscriber of the requesting set top box should be permitted to access the playlist;
    providing the requesting set top box access to the playlist responsive to determining from the user profile that the second subscriber is permitted to access the playlist;
    adjusting of a format of the playlist based at least in part on preferences received from the requesting set top box and the original set top box; and
    receiving a rating associated with the playlist and transmitting the rating to the original set top box.

2. The storage medium of claim 1, comprising computer instructions for providing the requesting set top box with access to the multimedia content identified in the playlist.

3. The storage medium of claim 2, comprising computer instructions for providing the requesting set top box with the access to the multimedia content by at least one of progressive download, full download, and streaming.

4. The storage medium of claim 1, comprising computer instructions for transmitting a reformatted playlist prior to adjusting the format of the playlist.

5. The storage medium of claim 1, wherein the group of set top boxes are in communication with each other over a virtual private network.

6. A server, comprising a controller to:
    monitor a group of set top boxes for a request for access to a playlist stored on an original set top box of the group of set top boxes after sending a notice to the group of set top boxes that the playlist was generated, the request for access being from a requesting set top box of the group of set top boxes, the playlist being generated by the original set top box and identifying multimedia content stored remotely from the original set top box, the original set top box being of a first subscriber, and the requesting set top box being of a second subscriber;
    provide the requesting set top box with the access to the playlist responsive to determining from a user profile of the first subscriber that the second subscriber is permitted to access the playlist; and
    adjust a format of the playlist based at least in part on preferences received from the requesting set top box and the original set top box.

7. The server of claim 6, wherein the group of set top boxes are in communication with each other over the Internet.

8. The server of claim 6, wherein the controller is adapted to provide the requesting set top box with access to the multimedia content identified in the playlist.

9. The server of claim 6, wherein the controller is adapted to receive a rating associated with the playlist, wherein the rating is generated by the requesting set top box.

10. The server of claim 6, wherein the controller is adapted to adjust a format of the playlist.

11. The server of claim 6, wherein the controller is adapted to prevent the requesting set top box from storing the playlist.

12. The server of claim 6, wherein the controller is adapted to determine permission for the access to the playlist.

13. The server of claim 6, wherein the controller is adapted to provide information associated with properties of the multimedia content identified in the playlist.

14. A set top box of a first subscriber, comprising a controller to generate and store a playlist that identifies multimedia content; receive a rating associated with the playlist transmitted from a server coupled to the set top box; adjust a format of the playlist based at least in part on a preference received from a requesting set top box of a second subscriber and a preference from the set top box of the first subscriber; and to provide access to the playlist in response to a request for access, wherein the request for access is transmitted over the Internet or a virtual private network, the request is generated by the requesting set top box of the second subscriber, wherein the multimedia content is stored remotely from the set top box of the first subscriber, and wherein the controller is operable to provide access to the playlist responsive to determining from a user profile of the first subscriber that the second subscriber is permitted to access the playlist.

15. The set top box of claim 14, wherein the request for access is from a requesting set top box, and wherein the set top box and the requesting set top box are among a group of set top boxes in communication over the Internet.

16. The set top box of claim 15, wherein the controller is adapted to receive a rating associated with the playlist, wherein the rating is generated by the requesting set top box.

17. The set top box of claim 15, wherein a format of the playlist is adjusted prior to receipt of the playlist by the requesting set top box.

18. The set top box of claim 14, wherein the controller is adapted to provide information associated with properties of the multimedia content identified in the playlist.

19. The set top box of claim 15, wherein the controller is adapted to provide notice of the playlist being generated by the set top box to at least one set top box of the group of set top boxes.

20. A set top box of a first subscriber, comprising a controller to transmit a request for access to a playlist of another set top box of a second subscriber; adjust a format of the playlist based at least in part on a preference received from the set top box of set top box of the second subscriber and a preference from the set top box of the first subscriber; and to present the playlist to a user when permission for access is granted, wherein the playlist identifies multimedia content and wherein the playlist is generated by the another set top box, wherein the request for access is transmitted over a virtual private network, and wherein the multimedia content is stored remotely from the set top box and the another set top box, and wherein the set top box of the second subscriber provides access to the playlist responsive to determining from a user profile of the second subscriber that the first subscriber is permitted to access the playlist.

21. The set top box of claim 20, wherein the set top box and the another set top box are among a group of set top boxes in communication over the Internet.

22. A method, comprising:
generating and storing a playlist on an original set top box that identifies multimedia content stored remotely from the original set top box;
receiving a rating for the playlist or for selections from the playlist transmitted from a server to the original set top box, wherein the rating is received by the server from a requesting set top box;
monitoring a group of set top boxes for a request for access to the playlist, the request for access being from the requesting set top box of the group of set top boxes, the group of set top boxes being in communication with each other over a virtual private network, the original set top box being of a first subscriber, and the requesting set top box being of a second subscriber;
determining from a user profile of the first subscriber whether the second subscriber of the requesting set top box should be permitted to access the playlist;
providing the requesting set top box access to the playlist responsive to determining from the user profile of the first subscriber that the second subscriber is permitted to access the playlist of the original set top box; and
adjusting of the format of the playlist based at least in part on preferences received from the requesting set top box and the original set top box.

* * * * *